Dec. 13, 1938.   L. S. JOSLIN   2,140,053
VEHICLE
Filed Oct. 9, 1934   4 Sheets-Sheet 1

Inventor,
Lawrence S. Joslin,
by Roberts, Cushman & Woodbury
Attys.

Dec. 13, 1938.    L. S. JOSLIN    2,140,053
VEHICLE
Filed Oct. 9, 1934    4 Sheets-Sheet 2
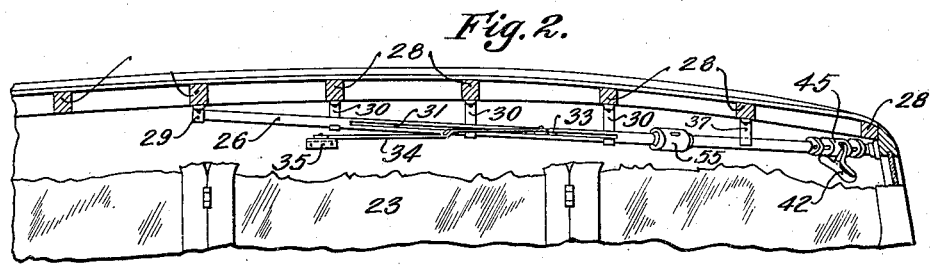
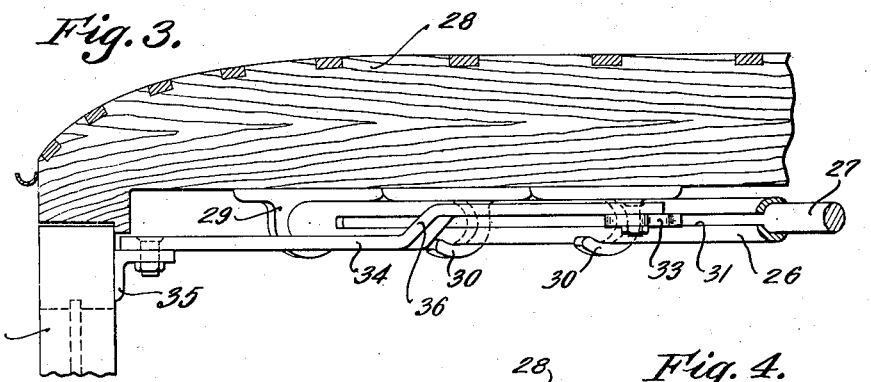
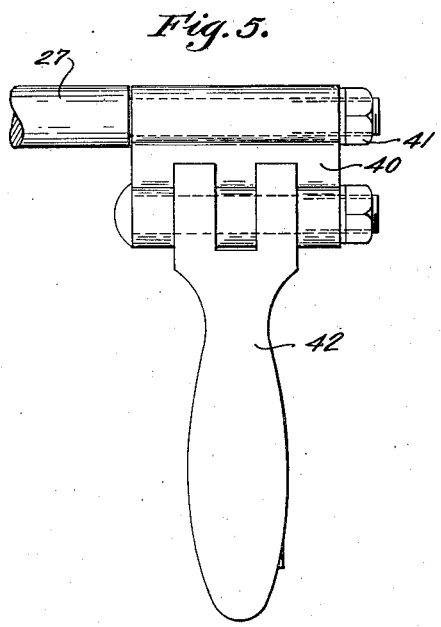
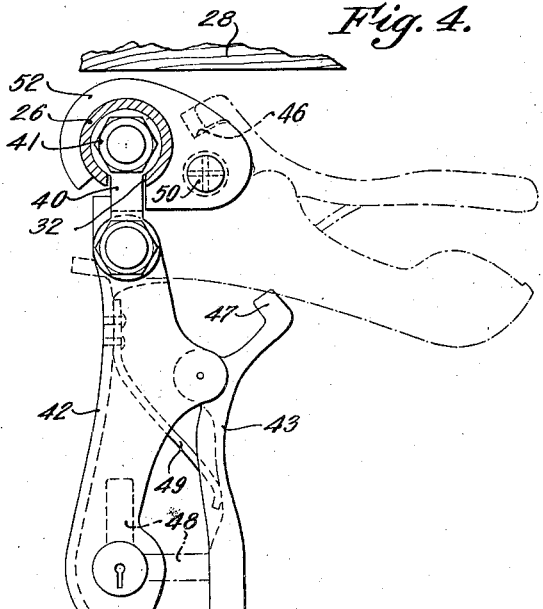
Inventor,
Lawrence S. Joslin,
by Roberts, Cushman & Woodberry
Attys.

Dec. 13, 1938.     L. S. JOSLIN     2,140,053
VEHICLE
Filed Oct. 9, 1934     4 Sheets-Sheet 4

Inventor,
Lawrence S. Joslin,
by Roberts, Cushman + Woodbury
Attys.

Patented Dec. 13, 1938

2,140,053

UNITED STATES PATENT OFFICE 2,140,053

VEHICLE

Lawrence S. Joslin, Braintree, Mass.

Application October 9, 1934, Serial No. 747,525

7 Claims. (Cl. 268—3)

This invention relates to an improvement in vehicles and has for its primary object to provide in a closed vehicle such as, for example, a taxi cab, a pleasure car, bus or truck of means whereby the driver or operator can open or close the doors without leaving his seat.

Other objects will appear from a consideration of the following description of certain embodiments of the invention and of the accompanying drawings in which such embodiments are illustrated and in which Fig. 1 is a plan view with parts broken away of a taxi cab equipped with mechanism embodying this invention for opening or closing the doors from the passenger compartment;

Fig. 2 is a side elevation of such door opening and closing mechanism and a portion of the taxi cab shown in Fig. 1;

Fig. 3 is an enlarged view of the portion of the door operating mechanism adjacent a door;

Fig. 4 is an elevation of one type of handle which might be employed in this mechanism, the operating position of the handle being shown in full lines and the locked position being shown in dotted lines;

Fig. 5 is a side elevation of the handle in the operating position;

Figure 1:
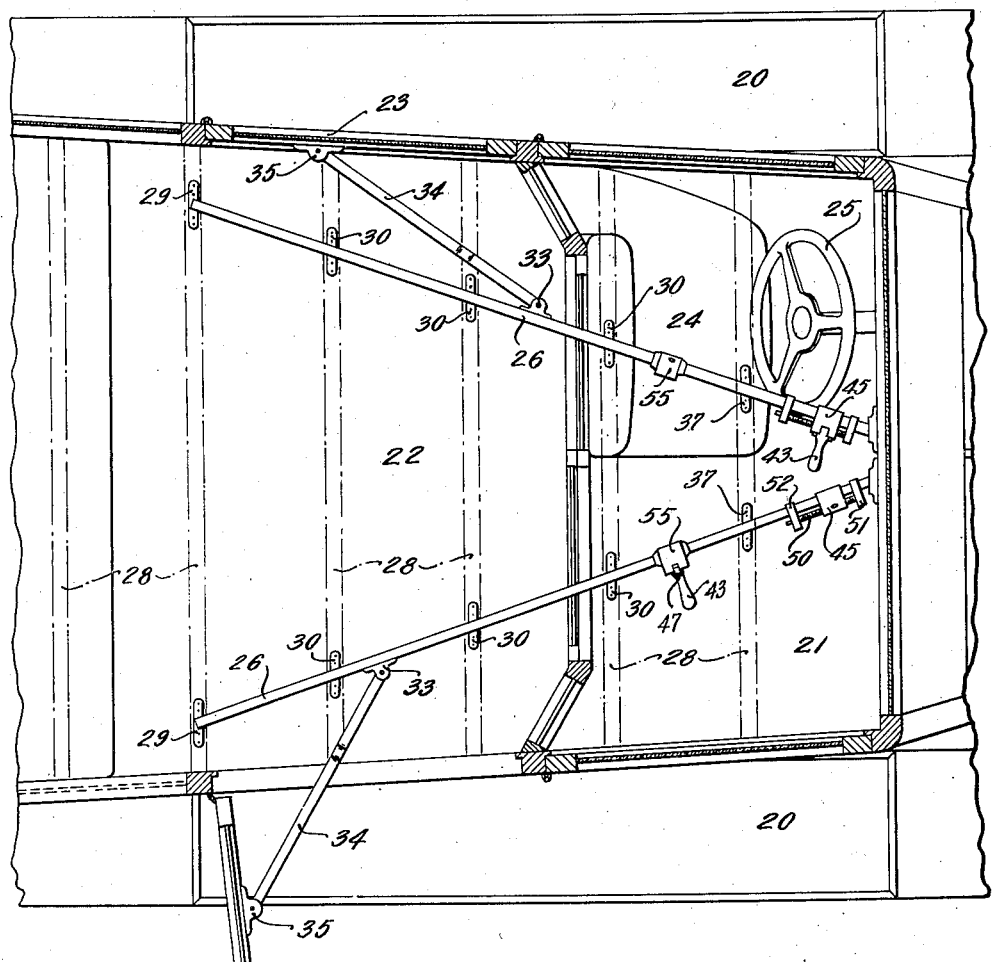

In Fig. 1 of the drawings is shown a taxi cab 20 having a driver's compartment 21 and a passenger's compartment 22. Access to the passenger's compartment 22 is provided through the doors 23 and the driver's seat 24 is shown behind the wheel 25.

The operating mechanism for each door includes a pipe 26 in which slides a rod 27. The pipe is secured to the top of the cab, for example the cross bows 28, by any suitable means pendent straps 29, 30 and 37 being shown in Fig. 3. In the walls of the pipe 26 are formed slots 31 and 32; the slots 31 being adjacent the door and in the side of the pipe and the slot 32 being adjacent the driver and in the bottom of the pipe. Fixed to the rod 27 and projecting outwardly through the side slot 31 is an ear 33 to which is pivotally secured a bar 34 pivotally attached at its other end to the door 23 through a bracket 35. The bar 34 is off-set intermediate its ends so that the ends are in parallel horizontal planes connected by an inclined portion 36 thus permitting the location of the pipe 26 at the top of the compartment. (See Fig. 3.) Because of the provision of the slots 31 and 32 in the pipe only the straps 29 at the end are closed, the straps 30 are hook shaped so that they do not cover the side slots 31 and the straps 37 are split so that they do not cover the bottom slot 32.

Projecting through the bottom slot 32 in the pipe 26 is a plate 40 fixed on the end of the rod (see Figs. 4 and 5) in any suitable way. As shown in the drawings the plate 40 includes a sleeve which surrounds the end of the rod which is reduced in diameter so that the diameter of the sleeve is the same as that of the remainder of the rod. The end of the rod may be threaded to receive a nut 41 by which the bar is fixed in place and in addition suitable key means may be provided to prevent any rotative movement of the plate independent of the bar.

Figure 6:
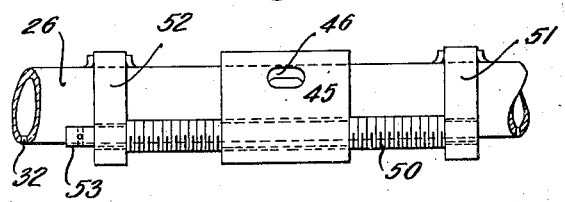
Figs. 6 and 7 are detailed view of portions of the operating mechanism.
Figure 7:
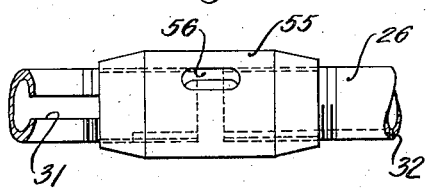

Pivotally secured to the plate 40 is a handle 42 provided with a latch 43. Surrounding the pipe 26 is a sleeve 45 (see Figs. 4 and 6) having an opening which registers with the slot 32 and a pocket 46 therein which receives the nose 47 of the latch when the handle 42 is swung upwardly into the dotted line position shown in Fig. 4. When so positioned the handle obviously prevents any longitudinal movement of the rod in the pipe. If it is desired to lock the latch in this position a key operated bar 48, pivotally secured to the handle 42, may be provided; the bar 48 in the extended position shown in Fig. 4 obviously preventing any releasing movement of the latch 43. A spring 49 normally holds the latch in the position shown in Fig. 4 so that when the handle 42 is raised the nose 47 will snap into the pocket 46. The handle 42 and latch 43 may be of any desired construction such as that shown in Fig. 4 wherein the handle is channeled in cross-section and the latch is so located that it will be engaged by the fingers of the operator and swung into the releasing position when the handle is swung down. The sleeve 45 has a threaded opening therethrough which receives a threaded rod 50 carried at its ends and freely rotatable in collars 51 and 52 secured in any suitable manner to the pipe and having openings which register with the slot 32 therein. One end 53 of the rod 50 is exposed so that it can be turned by a suitable wrench or spanner in order to move the sleeve 45 longitudinally along the pipe. By this construction the closure of the door is adjusted so that the door is fully closed when locked. The pipe 26 is made in two sections connected by a union 55 (see Fig. 7) having a pocket 56 therein and a slot which registers with the slot 32 in the pipe. The handle 42 when the door 23 is opened is at the union 55 and by swinging it upwardly as shown in dotted lines in Fig. 4 the nose 47 enters the pocket 56 and the door is locked open.

The construction of only one of the opening means has been described in detail but it will be understood that the other opening means shown in Fig. 1 is of similar construction and corresponding reference numerals have been applied thereto.

In a taxicab equipped with this invention the doors 23 to the passenger compartment are entirely within the control of the driver as he sits behind the wheel. He can open or close them without descending from his seat and can lock them in either the open or the closed position. Thus, when the doors are locked closed passengers are prevented from alighting before the cab comes to a stop, whereby one cause of accidents is eliminated and passengers are unable to leave the cab without paying their fares. Ordinarily the doors would not be locked open but would be held open by the driver to permit passengers to enter or leave. Under certain conditions however as when passengers need assistance or baggage is to be moved the driver will lock the door open so that he can descend from the seat and be of assistance.

Figs. 8 to 15 inclusive illustrate the application of this invention to a truck whereby the driver is enabled to open or close the door or doors of the carrying compartment without leaving his seat. The construction is very similar to that previously described and like it includes a pipe 60 having a rod 61 reciprocable therewith. A handle 62 is pivotally connected to a plate 63 fixed to the rod and extending through a bottom slot 64 in the pipe. The pipe 60 is suitably secured to the roof preferably to the cross bows indicated in Figs. 8 and 9 by dotted lines.

Figure 8:
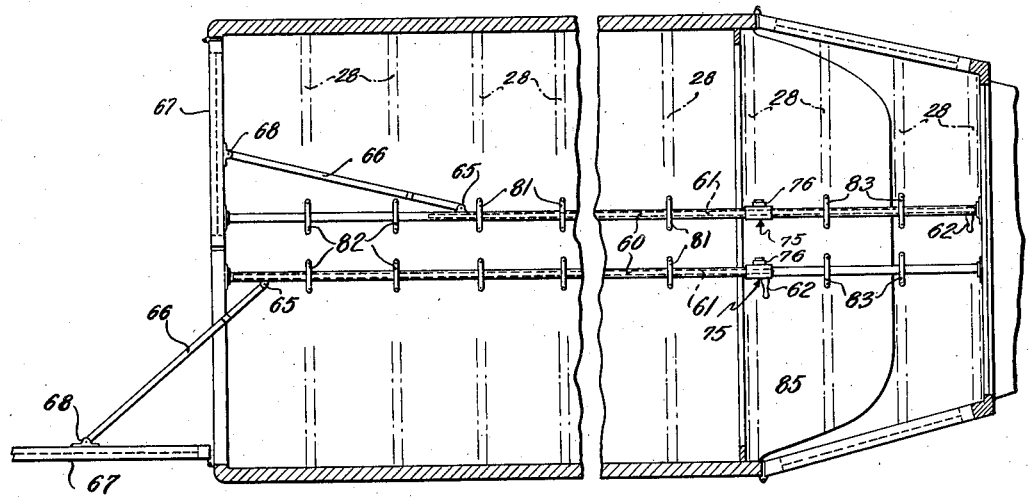
Fig. 8 is a sectional view with parts broken away of a truck equipped with an embodiment of this invention.
Figure 9:
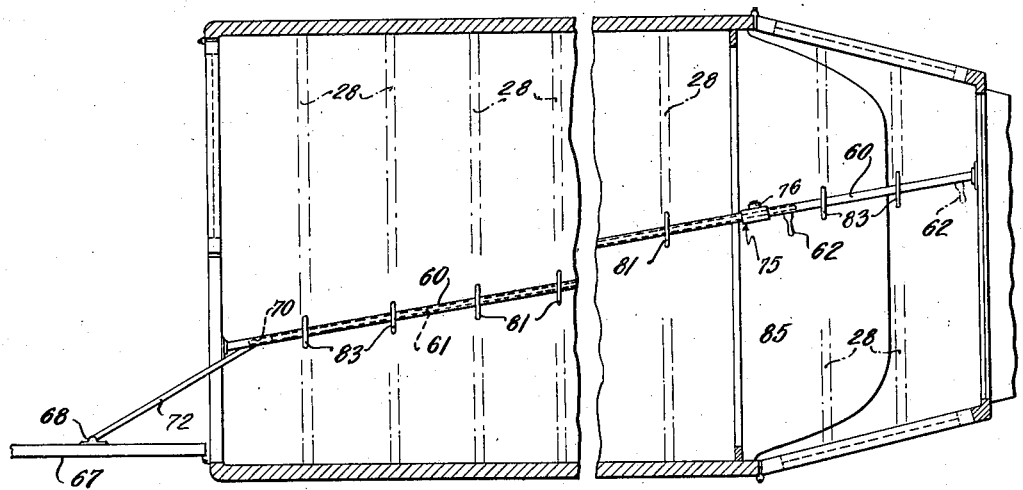
Fig. 9 is a similar view of another truck equipped with another embodiment of this invention.
Figure 11:
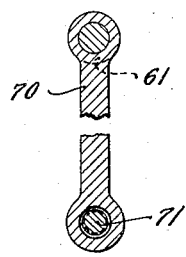
Fig. 11 is a sectional view taken along the line 11—11 of Fig. 10.
Figure 10:
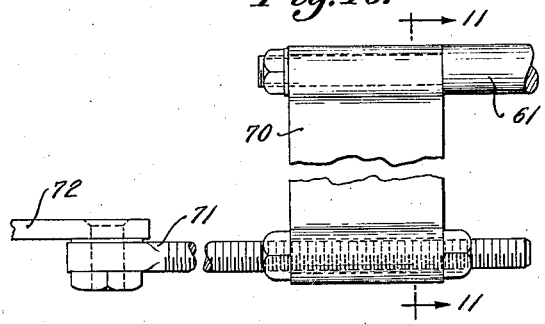
Fig. 10 is an enlarged view of a portion of the mechanism shown in Fig. 9.
Figure 13:
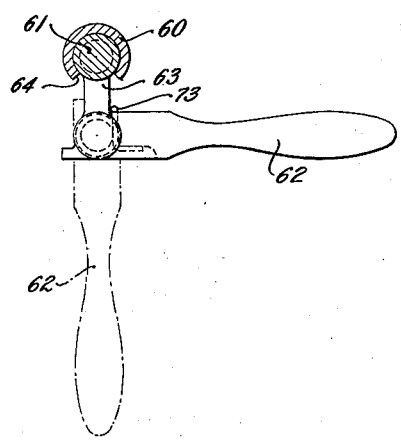
Fig. 13 is a front elevation of the handle shown in Fig. 12.
Figure 12:
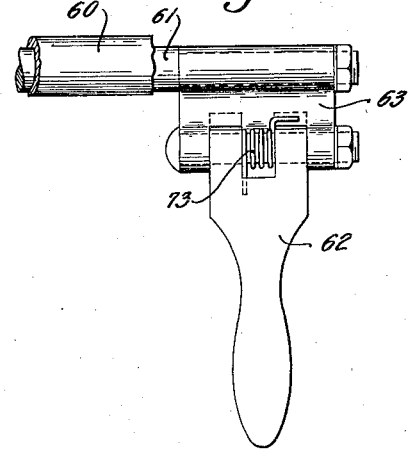
Fig. 12 is a side elevation of a handle which forms a part of the mechanism shown in either Fig. 8 or 9.

In the construction shown in Fig. 8 the rear end of the pipe has a side slot through which projects an ear 65 connected by a bar 66 to the rear door 67. The ends of the bar 66 are pivotally secured to the ear 65 and to a bracket 68 carried by the rear door. The rear doors are independently operated by the driver from the seat, the construction of both operating mechanisms being the same. The construction shown in Fig. 9 differs therefrom in that the pipe 60 has at the rear end a bottom slot through which projects a plate 70 fixed to the end of the rod 61 and having a bolt 71 to which is secured a bar 72 connected to the door 67 by the bracket 68. (See Figs. 10 and 11.) In this construction only one door is opened by the operator the other door being locked by a suitable bolt which must be released manually in the usual manner. The handle 62 of each construction is pivotally secured to the plate 63 and is normally held by the spring 73 in full line position shown in Fig. 13 so that the handle is at the roof of the truck and out of the way.

Figure 14:
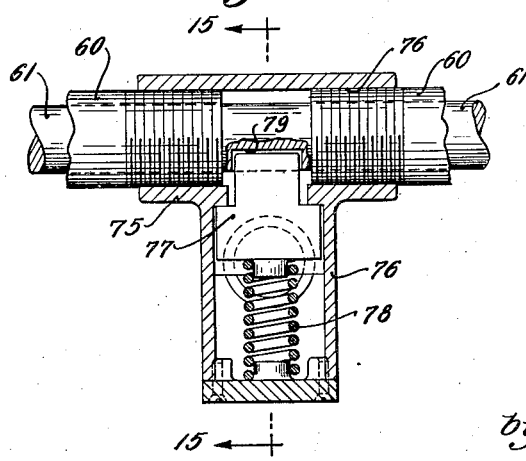
Fig. 14 is a sectional view of locking mechanism which may be employed particularly in the embodiment shown in Figs. 8 and 9.
Figure 15:
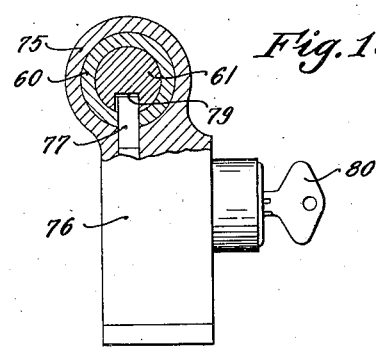
Fig. 15 is a view partly in section taken generally along the line 15—15 of Fig. 14.

For the purpose of locking doors in the closed position any suitable means may be provided as for example that shown in Figs. 14 and 15. Such means comprise a housing 75 having integral therewith a union which receives the ends of two sections of the pipe 60 and a lock casing 76. The lock mechanism may be of any well known type and is here shown as comprising a striker 77 normally urged by a spring 78 to enter a notch 79 formed in the rod 61. The striker 77 may be moved into inoperative position by a key operated mechanism 80 of any desired construction.

The pipe 60 in Fig. 8 is secured to the roof by straps 81, 82 and 83, the straps 81 being closed, the straps 82 being hook shaped to avoid interference with the side slot through which the ear 65 projects and the straps 83 being split so that they do not cover the slot through which the plate 63 projects. In the Fig. 9 embodiment the pipe has bottom slots only and hence only straps 81 and 83 are employed. The ends of the pipe 60 are received in sockets 84 preferably secured to the end walls of the truck body.

From the above description it will be apparent that the driver, without leaving the seat 85 can control the position of the door by advancing or retracting the handle 62 and can lock the door closed by means of the lock mechanism. When making deliveries the driver will retract the striker and move the rod 61 rearwardly so as to open the door. Should he find after going to the back of the truck that the door is not open wide enough he can pull it open farther by hand. When ready to close the door he does so in the usual manner and when the notch 79 in the rod 61 registers with the striker 77 the spring 78 advances the latter into the locking position. The door cannot then be opened until the striker has been retracted by the key 80.

In place of operating the doors independently either construction can easily be changed so that one mechanism will operate both doors simultaneously. Thus in Fig. 8 a single mechanism substituted for the two shown may be provided and both bars connected to the single rod and in Fig. 9 a second bar 72 and its associated parts may be provided, the single mechanism shown being preferably shifted slightly. It will be understood that in such arrangements the connections to one door, preferably the left door, will be such that that door will be closed first and that the right door will be opened first.

It will further be noted that the rod is completely enclosed within the pipe so that the mechanism presents a pleasing appearance with only the door operating arm exposed. This is particularly desirable in a taxicab or similar vehicle and would permit the greater part of the mechanism to be concealed by the roof covering, and reduces to a minimum any interference with the head room of the compartment that portion over the seat being entirely undisturbed.

While certain embodiments have been shown and described for the purpose of illustrating my invention it will be understood that I am not limited thereto and that other embodiments may be made without departing from the spirit and scope of my invention as set forth in the following claims.

I claim:

1. In a two compartment vehicle, mechanism for operating an outwardly swinging door of the compartment behind the driver's compartment comprising a pipe, a rod reciprocable therein, two longitudinally extending slots in the pipe one adjacent each end thereof, an ear carried by said rod and projecting through one of the slots in the pipe, a bar connecting said ear to the door, a plate fixed to said rod and projecting through the other slot in the pipe, a handle pivotally secured to said plate and locking means for said handle and operative only when the handle is swung into a certain position, said handle being reciprocable with said plate to cause the rod to operate the door and being movable relative to said plate into the locking position.

2. In a two compartment vehicle, mechanism for operating an outwardly swinging door of the compartment behind the driver's compartment comprising a pipe, a rod reciprocable therein, two longitudinally extending slots in the pipe one adjacent each end thereof, an ear carried by said rod and projecting through one of the slots in the pipe, a bar connecting said ear to the door, a plate fixed to said rod and projecting through the other slot in the pipe, a handle pivotally secured to said plate and locking means for said handle comprising an element carried by said pipe and a latch carried by said handle and brought into locking engagement with the element only when the handle is swung into a certain position, said handle being reciprocable with said plate to cause the rod to operate the door and being movable relative to said plate into the locking position.

3. In a vehicle, door operating mechanism comprising a pipe, a rod reciprocable therein, two longitudinally extending slots in the pipe one adjacent each end thereof, an ear carried by said rod and projecting through one of the slots in the pipe, a bar connecting said ear to a door, a plate fixed to said rod and projecting through the other slot in the pipe, a handle pivotally secured to said plate and locking means for said handle comprising a sleeve about said pipe and having a pocket therein, and a latch carried by said handle and brought into locking engagement with the pocket in the sleeve when the handle is swung into a certain position.

4. In a vehicle, door operating mechanism comprising a pipe secured to the roof of the vehicle body and made up of two sections connected by a union, said union having a pocket therein, a rod reciprocable in the pipe, a longitudinally extending slot in each pipe section, connections between the rod and a door passing through the slot of one section, a handle adjacent the driver's seat, connections between the rod and the handle passing through the slot of the other section, and handle locking means comprising a latch carried by the handle and adapted to engage the pocket in the union.

5. In a vehicle, door operating mechanism comprising a pipe secured to the roof of the vehicle body, a rod reciprocable therein, a connection from one end of the rod to a door, a handle adjacent the driver's seat, connections from the other end of the rod to said handle, whereby the driver can reciprocate the rod and open or close the door, a sleeve at the driver's end of the pipe having a pocket therein, and a latch on said handle adapted to engage the pocket in the sleeve when the handle is in one position to lock the door closed.

6. In a vehicle, door operating mechanism comprising a pipe secured to the roof of the vehicle body, a rod reciprocable therein, a connection from one end of the rod to a door, a handle adjacent the driver's seat, connections from the other end of the rod to said handle, whereby the driver can reciprocate the rod and open or close the door, a sleeve at the driver's end of the pipe having a pocket therein, a latch on said handle adapted to engage the pocket in the sleeve when the handle is in one position to lock the door closed and means for adjusting the position of the sleeve along the pipe to determine the position of the door when it is locked closed.

7. In a vehicle, door operating mechanism comprising guiding means secured to the roof of the vehicle body, a slide reciprocable in the guiding means, a connection between the slide and door to be operated, a depending pivotally mounted handle carried by the slide adjacent the driver's seat, and handle locking means associated with the handle, said handle being adapted to swing upon its pivot independently of the slide whereby it can assume a substantially horizontal out of the way position beneath the roof of the vehicle in which position it is held by said handle locking means.

LAWRENCE S. JOSLIN.